United States Patent [19]
Michels et al.

[11] Patent Number: 5,690,015
[45] Date of Patent: Nov. 25, 1997

[54] PNEUMATIC BRAKE BOOSTER

[75] Inventors: Erwin Michels, Kail; Peter Schlüter, Kammerforst, both of Germany

[73] Assignee: Lucas Industries public limited company, United Kingdom

[21] Appl. No.: 615,274

[22] PCT Filed: Oct. 27, 1994

[86] PCT No.: PCT/EP94/03535

§ 371 Date: Mar. 1, 1996

§ 102(e) Date: Mar. 1, 1996

[87] PCT Pub. No.: WO95/12511

PCT Pub. Date: May 11, 1995

[30] Foreign Application Priority Data

Nov. 2, 1993 [DE] Germany .......... 43 37 361.5

[51] Int. Cl.⁶ .................................. F15B 9/10
[52] U.S. Cl. ........................ 91/369.1; 91/376 R
[58] Field of Search ................ 91/369.1, 369.2, 91/369.3, 376 R

[56] References Cited

U.S. PATENT DOCUMENTS

| | | | |
|---|---|---|---|
| 5,263,399 | 11/1993 | Flory et al. | 91/376 R |
| 5,460,074 | 10/1995 | Balz et al. | 91/376 R X |
| 5,479,844 | 1/1996 | Heilbel et al. | 91/376 R X |

FOREIGN PATENT DOCUMENTS

| | | |
|---|---|---|
| 0140187B1 | 1/1990 | European Pat. Off. . |
| 0478396A1 | 4/1992 | European Pat. Off. . |
| 3625815A1 | 2/1988 | Germany . |
| 3820657A1 | 12/1989 | Germany . |
| 3920766A1 | 1/1991 | Germany . |
| 4238333A1 | 5/1994 | Germany . |

*Primary Examiner*—Hoang Nguyen
*Attorney, Agent, or Firm*—Wood, Herron & Evans L.L.P.

[57] ABSTRACT

The invention relates to a pneumatic brake booster comprising a housing (10) which is divided into a vacuum chamber (14) and a working chamber (12), in which a dual valve arrangement (20) having a first valve (24, 26) between the vacuum chamber (14) and the working chamber (12) and a second valve (24', 26') between the ambient atmosphere (A) and the working chamber (12) is arranged at the housing (10), in which the valve arrangement (20), in an inoperative position, allows having pressure levels in the vacuum chamber (14) and in the working chamber (12) which are different from the ambient atmospheric pressure (A), and in an operative position, keeps the vacuum chamber (14) sealed off and allows communication between the ambient atmosphere (A) and the working chamber (12), wherein, in normal operation, the first valve (24, 26) and the second valve (24', 26') are actuatable by a common actuating rod, and, in a controlled operation, an electromagnetic actuator (40, 46) which is independent of the actuating rod (34) prevents communication between the vacuum chamber (14) and the working chamber (12) when the actuating rod (34) effects an opening of the first valve (24, 26).

16 Claims, 3 Drawing Sheets

PNEUMATIC BRAKE BOOSTER

The present invention relates to a pneumatic brake booster comprising a housing which is divided into a vacuum chamber and a working chamber, in which a dual valve arrangement having a first valve means between the vacuum chamber and the working chamber and a second valve means between the ambient atmosphere and the working chamber is arranged at the housing, in which the valve arrangement, in an inoperative position, allows having pressure levels in the vacuum chamber and in the working chamber which are different from the ambient atmospheric pressure, and in an operative position, keeps the vacuum chamber sealed off and allows communication between the ambient atmosphere and the working chamber, and in normal operation is actuatable by an actuating rod.

A pneumatic brake booster of this type has been known from EP 0 478 396 A1. But it is a drawback of said arrangement that the construction of the valve necessitates different, relatively small cross-sections of the valve passages which may cause undesired whistling or sizzling upon actuation of the brake booster. Besides, the speed of pressure build-up or pressure decay, respectively, is relatively low because of the small cross-sections. Another disadvantage of the arrangement of the electromagnetic actuator is that the coil is immovable with respect to the valve housing of the brake booster and an armature slidingly displaceable on the actuating rod is disposed in the interior of the electromagnetic coil; said armature must be able to move with little delay and low friction both with respect to the inner wall of the coil and with respect to the actuating rod. Since the actuating rod performs also a slight tilting movement during its movement in longitudinal direction, it is possible that problems are encountered (jamming, canting or the like of the armature relative to the actuating rod or the coil). Another problem in said arrangement is constituted by the number of movable parts or parts to be moved which have to be provided with the respective tolerances and made wear resistant.

Another drawback of said arrangement is that, when the pedal is not actuated, an automatic braking by activation of the magnetic coil is not possible, for an effective sealing of the working chamber vis-à-vis the vacuum chamber along the entire stroke of the valve housing cannot be attained because of the high axial movability of the valve housing relative to the actuating rod, and the comparatively small, possible opening stroke of the valve between the working chamber and the ambient atmosphere.

From DE 39 20 766 A1 it has been known to provide a vacuum pressure brake booster in which the valve body can be pulled in opposite directions by two electromagnets disposed in the control valve housing, for building up pressure in the brake system independently of the pedal actuation.

It has been known from EP 0 140 187 B1 to provide a brake booster in which, for pressure compensation, the vacuum chamber and the working chamber may be connected by an electromagnetically controlled valve. It is furthermore described that an actuation of the brake system is achieved by a controlled additional ventilation of the working chamber. The arrangement described in said patent is relatively large in size and complex, however, due to the externally arranged separate solenoid valve.

From DE 38 20 657 A1 it has been known to provide a pneumatic brake booster comprising a housing which is divided into a vacuum chamber and a working chamber. A dual valve arrangement is disposed with a first valve means between the vacuum chamber and the working chamber, and with a second valve means between the ambient atmosphere and the working chamber. In an inoperative position, the valve arrangement allows a pressure level in the vacuum chamber and in the working chamber that is different from the ambient atmosphere. In an operative position, the valve arrangement keeps the vacuum chamber sealed off and allows a communication between the ambient atmosphere and the working chamber. An electromagnetic actuator which is independent of the actuating rod of the brake booster prevents a communication between the vacuum chamber and the working chamber when the actuating rod effects an opening of the first valve means.

DE 36 25 815 A1 provides a motor vehicle brake system comprising a dual disk valve. Said dual disk valve is in axial direction biased by a helical spring and actuated by means of a solenoid.

It is the object of the invention, starting from said prior art, to develop a brake booster of the afore-named type in such a way that a compact arrangement is made possible while other components are maintained to a considerable extent, and that the electrically controlled actuation of the brake booster can be effected independently of (and thus also in addition to) the mechanical actuation of the brake system by the actuating rod.

For solving the problem it is provided according to the present invention that an electromagnetic actuator may be actuated which, in a controlled (or automated) operation, is independent of the actuating rod, and which prevents a communication between the vacuum chamber and the working chamber in response to the actuating rod causing an opening of the first valve means.

This construction allows maintaining the pressure difference between the vacuum chamber and the working chamber independently of the mechanical actuation of the actuating rod, even if the movement of the actuating rod acts in the sense of terminating the braking operation (balancing of the pressure conditions between the vacuum chamber and the working chamber). This makes it possible to have the pedal-controlled brake actuation overlayed by an electronically controlled (automated) assistance in such a way that e.g. the required pedal force can be maintained, independent of the actual vehicle weight or the load added to the vehicle. To this end, the required electronic overlaying of the pedal actuation by the electromagnetic actuator is determined experimentally or by computation for the different loads and is automatically connected upon a braking operation. The actual delay can be measured also by a sensor at the vehicle in order to have a feedback to the control means, and can also be taken into consideration upon the overlaying operation.

In a preferred embodiment is a sealing element coupled to the electromagnetic actuator which, when the electromagnetic actuator has been actuated, prevents a passage through the first valve, when the actuating rod effects an opening of the first valve means.

The valve arrangement is preferably formed by two successive valve seats which are adapted to be displaced longitudinally by the actuating rod, and by two elastic parts which are mutually supported by a spring element. Said valve seats may be relatively large in size since they may virtually be disposed at the inner wall of the valve casing. This offers a large passage area for the air streams whereby the noise level is kept low and a rapid pressure build-up or pressure decay in the working chamber can be achieved.

The first valve seat cooperates with a first valve body disposed at the valve casing, said valve body having a rim-shaped continuous edge along which the sealing element is displaceable with a sliding fit. The valve body is preferably formed integrally with the inner wall of the valve casing as a projection forming a channel together with the inner wall that is in communication with the vacuum chamber.

In a preferred embodiment is the sealing element rigidly connected to the electromagnetic actuator by means of a support which is arranged to extend coaxially and concentrically with respect to the actuating rod. The support has the shape of an approximately cylindrical cage with openings allowing the unobstructed flow of the ambient atmosphere into the working chamber.

The electromagnetic actuator is preferably supported in the valve casing by at least three abutment elements so as to be displaceable in longitudinal direction, thereby forming a ventilation gap between the coil body and the valve casing.

Additional complex parts are dispensible if the electromagnetic actuator is provided at its end facing the valve arrangement with a second valve body which cooperates with the second valve seat.

In a manner similar to the first valve means, the second valve body is provided with a rim-shaped continuous edge cooperating with the second valve seat. Each of the two valve seats is molded to elastic rings made of rubber; the rings are approximately semi-circular in cross-section. An extension shoulder is molded to one flank of the semi-circle for supporting the ring in the valve casing. A corner element is molded to the other flank which between itself and the outer wall of the flank receives a catch for the valve seat.

The electromagnetic actuator on which the respective valve body is mounted is biased against the valve arrangement by means of a spring element to always warrant a safe sealing of the second valve. The two valve seats, in turn, are through their respective catches biased against each other by a spring in such a way that the first valve seat, too, is safely urged against its associated valve body.

The electromagnetic actuator is preferably formed as coil arrangement surrounding the actuating rod and moving towards the armature element against the force of the spring element when current is applied; said armature element is disposed at the actuating rod.

Further advantages, features and details are described below by means of schematic drawings illustrating two exemplified embodiments of the invention, in which.

Figure 1:
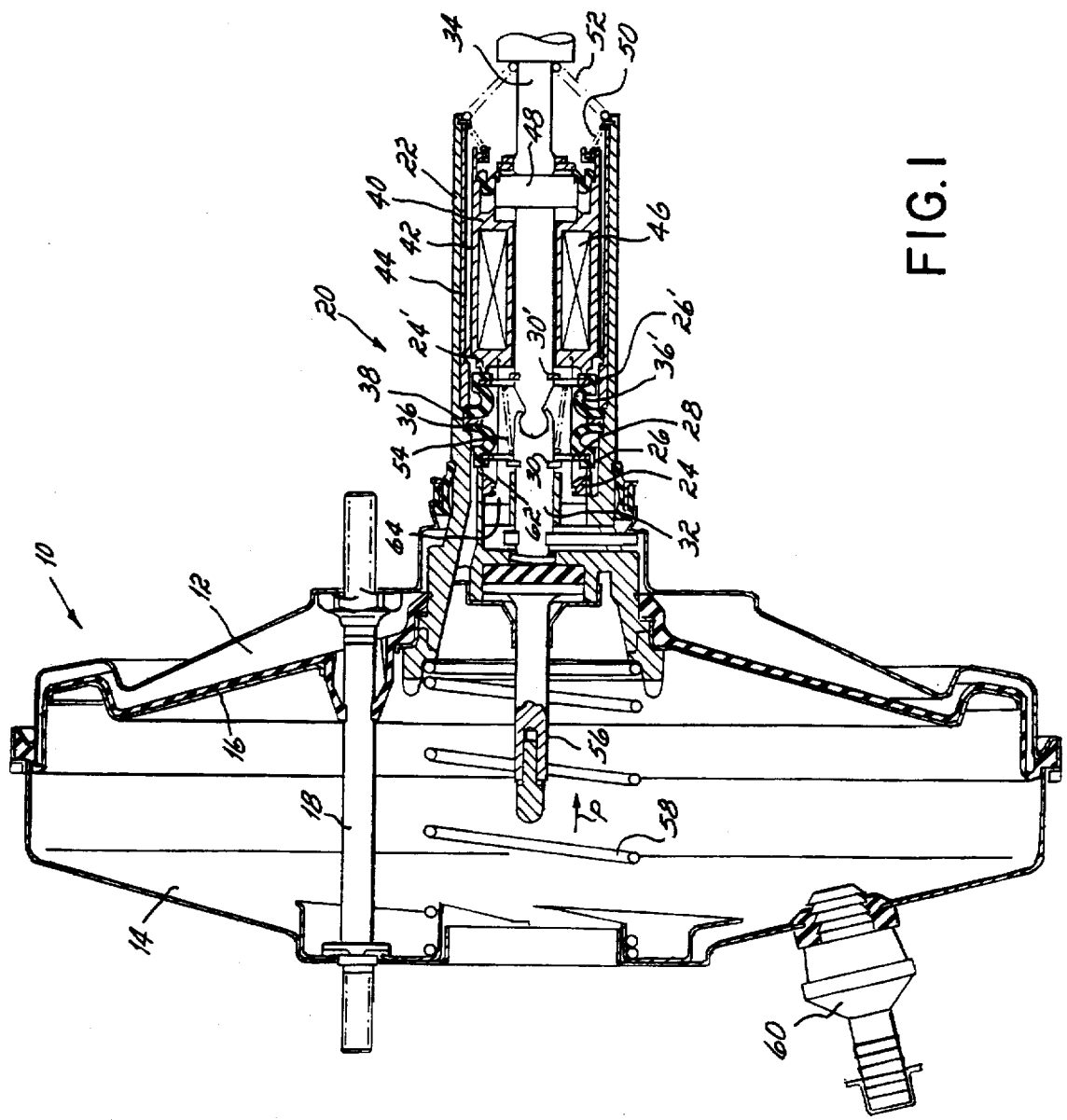
FIG. 1 is an axial section of a brake booster.

The brake booster as illustrated comprises a substantially rotation-symmetrical housing 10 in which a working chamber 12 and a vacuum chamber 14 separated by a movable wall 16 are arranged. Axis-parallel tie-rods 18 extend through the housing 10 by means of which the brake booster can be fastened to the splashboard of a motor vehicle.

The brake booster includes a valve arrangement 20 with an also substantially rotation-symmetrical valve housing 22 that is connected with the movable wall 16 for joint relative movement with respect to the housing 10 and has a first ring-shaped valve body 24 embodied by an edge extending con-centrically with the valve housing 22. Said first valve body 24 cooperates with a first valve seat 26. The valve seat 26 is stabilized by a catch ring 28 and movable in axial direction by a circlip 30 arranged on a plunger rod 32.

At its end pointing away from the housing 10 the plunger rod 32 is provided with a recess in which an actuating rod 34 is caulked thereby forming a ball joint. The actuating rod 34 is connected with the brake pedal of the motor vehicle (not shown) when assembled.

Figure 2:
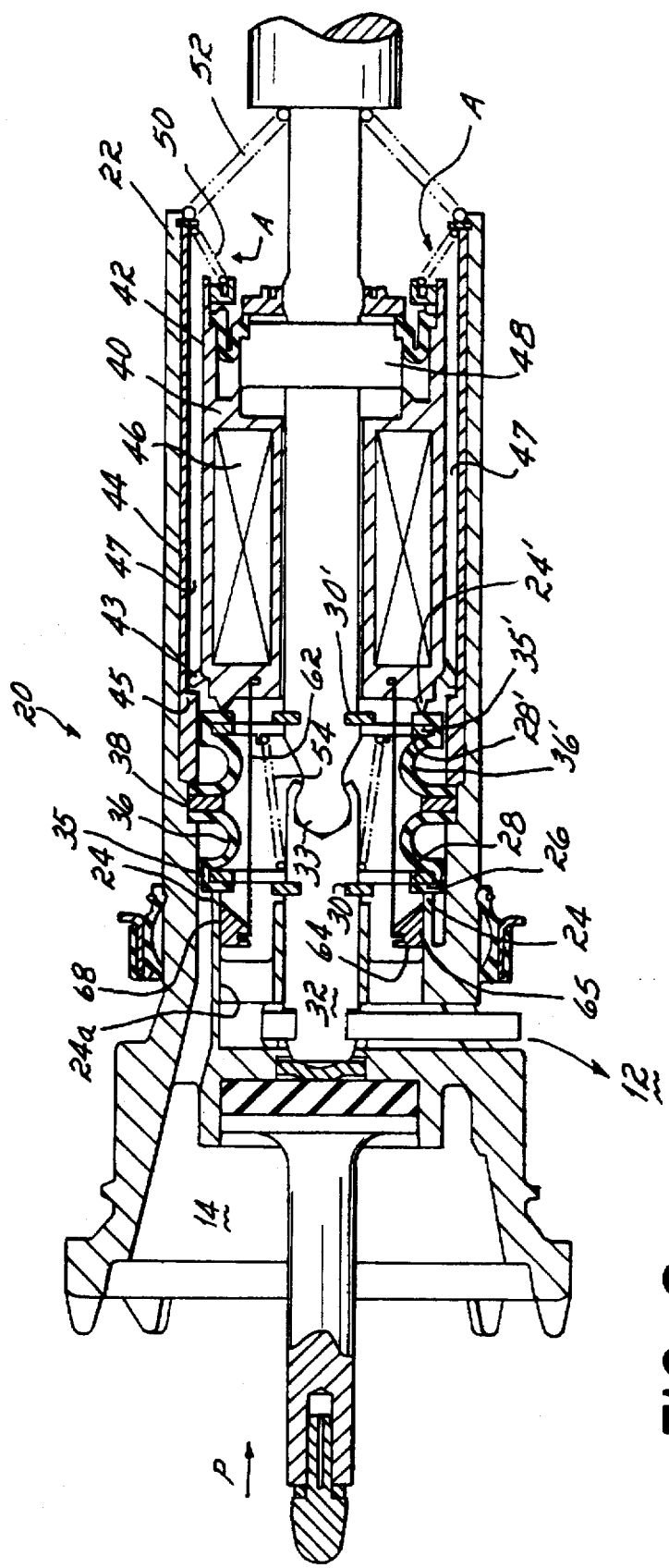
FIG. 2 is an enlarged section out of FIG. 1 with the valve housing.

FIG. 2 illustrates a first embodiment of the valve arrangement 20 in detail. The first valve 24, 26 effects a connection between the vacuum chamber 14 and the working chamber 12 or interrupts it. The first valve seat 26 has an L-shaped configuration in cross-section. The first one 24 of the valve bodies forms a surface extending radially with respect to the center axis of the valve casing 22. A connecting web 35 extends at a right angle to said surface (coaxial with the valve housing) up to a rubber ring 36 being about semicircular in cross-section and rendering the movability of the valve seat 26 in axial direction possible by compressing or drawing apart the flanks of the ring.

The second valve 24', 26' comprises a rubber ring 36' identical with rubber ring 36 with a valve seat 26' molded thereto that is stabilized by a catch ring 28' identical with catch ring 28. The rubber ring 36' is fitted into the valve casing 22 back to back with the first rubber ring 36, separated by a retaining ring 38. The first and second valve seats 26, 26' of the valve arrangement 20 may also be a single rubber part into which the retaining ring 38 and the catch rings 28, 28' are vulcanized.

A ring-shaped, uninterrupted valve body 24' which is molded integrally with the front side of a hollow-cylindrical coil body 40 rests on the second valve seat 26'. The coil body 40 is slipped on the actuating rod 34 and its radial dimensions are such that an annular air gap remains between the outer wall 42 of the coil body 40 and the inner wall 44 of the valve housing 22.

The coil body 40 contains an electromagnetic coil 46 cooperating with an armature 48 arranged on the actuating rod in such a manner that when current is applied to the coil 46 the coil body 40 is moved coaxially with respect to the actuating rod 34, away from the valve arrangement 20 toward the armature 48. A compression spring 50 biases the coil body 40 at the valve housing 22 in the direction of the valve arrangement 20. The actuating rod 34 is biased against the valve housing 22 in a direction opposite thereto, away from the valve arrangement 20, by means of a spring 52.

Three or more abutment elements 43 are molded to the same end of the coil body 40 as the valve body 24', distributed along the circumference of the outer wall of the coil body 40. They cooperate with an abutment 45 arranged at the inner wall 44 of the valve housing to limit the axial movability of the coil body 40 in the valve housing 22 in the direction toward the valve arrangement 20.

A compression spring 54 is arranged between the catch rings 28, 28' of the first and second valves 24, 26; 24', 26' urging the two catch rings 28, 28' against the respective circlips 30, 30' on the actuating rod 24, and the plunger rod 32, respectively, and hence the valve seats 26, 26' against the respective valve bodies 24, 24'.

An output member 56 bearing against the valve casing 22 of the valve arrangement 20 is arranged in the housing 10 of the brake booster; said valve housing 22 and hence also the movable wall 16 are biased in the direction of arrow P by a return spring 58. The output member 56 is provided to actuate a master brake cylinder that is fastened to the front side of the housing 10 through the tie-rods 18 and projects into the interior of the vacuum chamber 14. The vacuum chamber 14 includes a connecting piece 60 connecting the vacuum chamber 14 with a vacuum source, e.g. a suction duct of an internal combustion engine.

In the rest condition, when the vacuum source is turned off, atmospheric pressure is in both chambers 12 and 14. When the vacuum source is turned on, e.g. when the engine is running with the suction pipe of which the connecting piece 60 is connected, a vacuum results in the front chamber 14, so that the movable wall 16 and along with it the valve casing 24 are moved in forward direction by a minor amount until the first valve body 24 and the first valve member 26 get just separated from each other. A pressure equilibrium between the two chambers 12 and 14 results again.

An approximately cylindrical retainer 62 that is coaxial and concentric with the actuating rod 34 and projects through the first and second valves 24, 26; 24', 26' into the direction of the housing 10 and carries a sealing element 64 at its free end is arranged at the front end of the coil body 40—radially offset inwardly with respect to the valve body 24'. The sealing element 64 has a ring-like configuration and an outer surface 68 whose dimensions are in accordance with the inside dimensions of the tube-like section 24a forming the first valve body 24 such that the sealing element 64 can slide along the inner wall of the tube 24a with sliding fit. An annular seal 65 is additionally inserted in a corresponding groove in the sealing element 64 to improve the sealing effect.

The sealing element 64 tapers in the direction of the first valve seat 26. The sealing element 64 is ineffective in a not activated condition, i.e. when the coil body 40 is urged toward the valve arrangement 20 by the spring 50, as it is set back with respect to the active edge of the first valve element 24. However, if the coil arrangement 42—when impinged by energy—moves in the direction of the armature 48 by taking the spool 40 along with it, the active edge of the sealing element 64 gets also in engagement with the first valve seat 26. With the brake being released, i.e. when the first valve should actually effect a connection between the vacuum chamber 14 and the working chamber 12, the sealing element 64 prevents said first valve 24, 26 from opening in that it closes the gap that would result between the active edge of the valve element and the valve seat 26.

Figure 3:
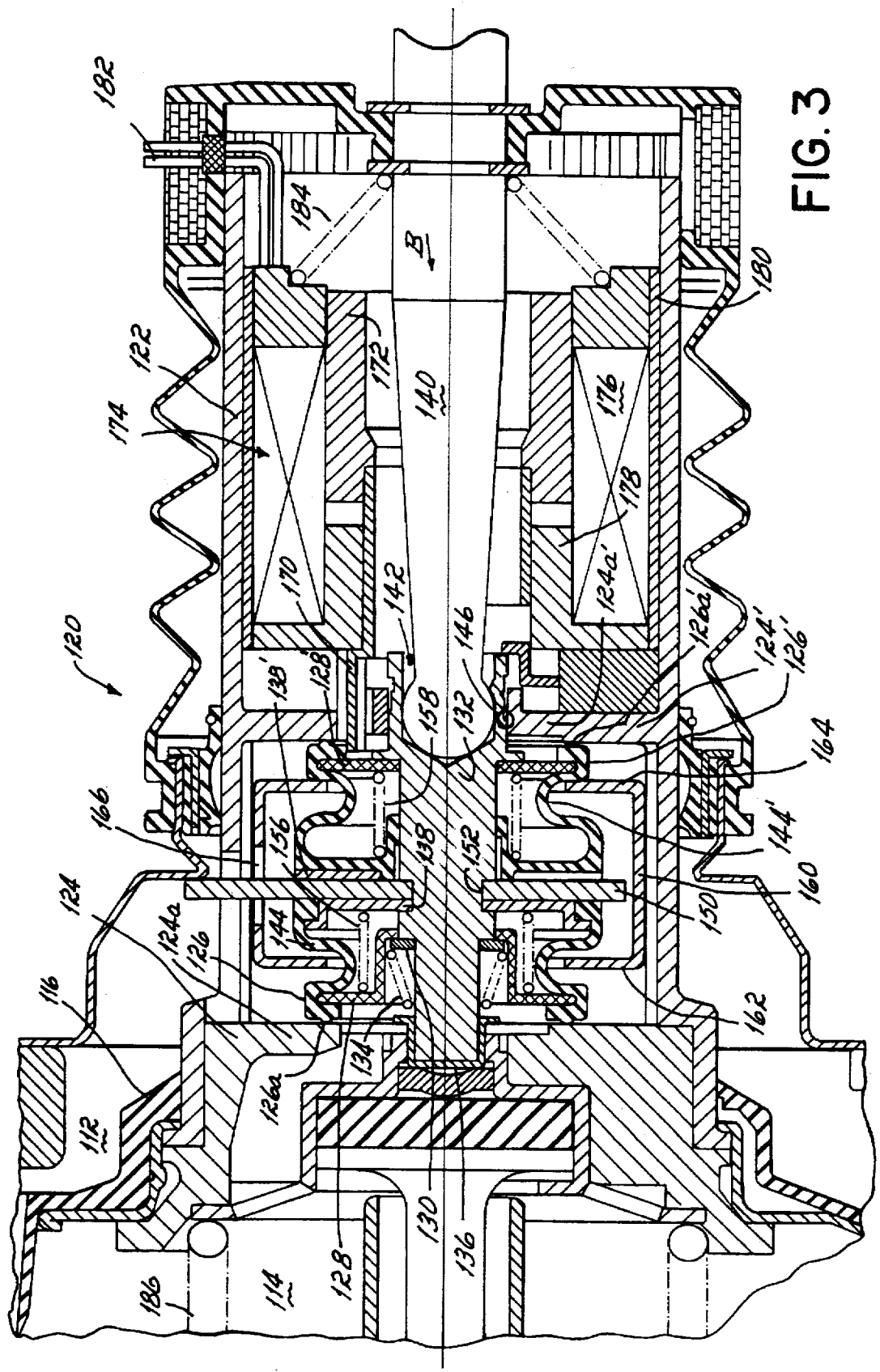
FIG. 3 is an enlarged section of another embodiment of the valve housing.

FIG. 3 illustrates an enlarged section of a second embodiment of the valve casing for a brake booster according to the present invention. The valve arrangement 120 includes a substantially rotation-symmetrical valve casing 122 that is connected with the movable wall 116 for joint relative movement with respect to the housing of the brake booster. The valve arrangement 120 comprises a first ring-shaped valve body 124 having an inwardly directed collar 124a. Said first valve body 124 cooperates with a first valve seat 126 that is stabilized by a catch ring 128 and movable in axial direction by a circlip 130 located on a pressure rod 132. The circlip 130 is supported against a cap 136 covering the front end of the pressure rod 132 by means of a cone-shaped helical spring 134. The spring-loaded circlip 130 allows an axial relative movement of the abutment of the first valve 124, 126 with respect to the pressure rod 132. In its rear end pointing away from the booster housing the pressure rod 132 is provided with a recess in which an actuating rod 140 is caulked thereby forming a ball joint. The actuating rod 140 is connected with the brake pedal of the motor vehicle (not shown) when in assembled condition.

The first valve 124, 126 either effects a connection between the vacuum chamber 114 and the working chamber 112 or interrupts it. The first valve seat 126 is L-shaped in cross-section. The first valve body 124 forms a surface extending radially with respect to the center axis of the valve casing 122 against which a continuous sealing lip 126a of the first valve seat 126 may rest. A bellows section 144 semi-circular in cross-section is molded to the first valve seat 126 rendering the movability of the first valve seat 126 in axial direction possible by compressing or drawing apart the flanks of the bellows 144.

The second valve 124', 126' has a substantially mirror-inverted configuration as compared to the first valve 124, 126. There, too, a flank 124a directed radially from the inner wall of the casing 122 in the direction of the pressure rod 132 is provided which at the same time represents an axial guide 146 for the pressure rod 132. The second valve seat 126' is L-shaped in cross-section. The valve body 124 forms a surface extending radially with respect to the center axis of the valve housing. Here, too, an uninterrupted sealing lip 126a at the valve seat 126' effects a well-defined seal.

The second valve 124', 126' comprises also a rubber bellows 144' semi-circular in cross-section that renders the moveability of the valve seat 126' in axial direction possible by compressing or drawing apart the flanks of the bellows.

The first and the second bellows 144, 144' bear back to back against a radial abutment member 150 held immovable in axial direction in an annular groove 152 in the pressure rod 132. A retaining ring 138, 138' each is vulcanized to the respective bellows 144, 144' at either side of the abutment member 150. Two helical springs 156,158 each are arranged between the discs 138, 138' and the catch rings 128, 128' so as to surround the pressure rod 132 to keep the first valve 124, 126 and the second valve 124', 126' biased in their respective closed positions.

A control cage 160 is arranged in the casing 122 which has a substantially cylindrical configuration and is provided on both its front and rear ends with radially inwardly extending webs 162, 164. Said webs 162, 164 engage the bellows sections 144, 144'. A recess 166 is provided in the jacket surface of the control cage 160 through which the abutment member extends radially outwardly.

The web 164 may abut the second valve seat 126' for a movement of the valve seat 126' in axial direction to be transmitted to the control cage 160. The abutment member 150 defines the rest position of the pressure rod 132 with respect to the housing.

A thrust member 170 having a plurality of radially distributed arms engages the catch ring 128' of the second valve 124', 126' on the side that is opposite the helical spring 158, said arms abutting the front end of the catch ring 128'. The thrust member is rigidly connected with a soft iron armature 172 being a part of the electromagnetic actuator 174 which comprises further an electromagnetic coil 176 as well as soft iron parts 178 and 180 surrounding the coil for the magnetic flux. The coil 176 is connected with an electronic control unit (not illustrated) via two lines 182.

To operate the brake booster, it is differentiated between the three modes of operation described in the following with reference to the embodiment of valve arrangement 20 according to FIG. 2.

In normal operation the spring 50 biases the coil body 40 in the direction of the valve arrangement 20 so that both valves 24, 26; 24', 26' are closed and the sealing element 64 is in its non-operated condition. When the actuating rod 34 is moved in the direction of the housing 10, the second valve seat 26' is displaced due to the rubber ring 36' being compressed via the circlip 30' and the catch ring 28', and the valve seat 26' being lifted off the valve body 24'. The coil body 40 with the valve body 24' formed on the front end thereof follows the axial movement of the valve element 26' until the abutment elements 43 abut the step-shaped stop 45 on the inner wall 44. During the further axial movement of the actuating rod 34 the valve bodies 24' and the valve element 26' get disengaged which allows air to flow from the ambient atmosphere A into the working chamber 12 through the annular gap between the inner wall 44 of the valve housing 22 and the outer wall 42 of the coil body 40.

The pressure difference between the vacuum chamber 24 and the working chamber 12 building up makes the movable wall 16 move opposite to the direction of arrow P. The valve housing 22 is taken along as well. The coil body 40 follows this movement due to the force of spring 50. This joint movement of valve housing 22 and coil body 40 is terminated as soon as the valve body 24' on the front end of the coil body 40 has again reached the valve seat 26'. This interrupts again the connection between working chamber 12 and the ambient atmosphere, so that a defined pressure and hence boosting ratio between the vacuum chamber 14 and the working chamber 12 has adjusted.

As soon as the impingement of the actuating rod 34 with axial force is terminated (the brake pedal was released), the actuating rod 34 moves in the direction of arrow P due to the force of spring 52. This effects the opening of the first valve 24, 26 as the circlip 30 moves the catch ring 28 in the direction of arrow P; thus the ring 36 with the first valve seat 26 formed thereon gets away from the valve body 24. The second valve 24', 26' is already closed during this operation, so that there is no communication with ambient atmosphere when a pressure compensation between the vacuum chamber 14 and the working chamber 12 is effected through the first valve 24, 26 such that the working chamber 12 is brought to the same vacuum level as the vacuum chamber 14. The boosting effect of the brake booster is reduced in this manner.

In an automatized braking operation, current is fed to the coil arrangement 46—by the electronic control of the brake booster—to cause the coil body 40 to move in the direction of armature 48, relative to the actuating rod 34, in the direction of arrow P against the force of spring 40. This causes valve 24', 26' to open because the valve body 24' at the front end of the coil body 40 is lifted off the valve element 26' while the valve element 26' is held in a position unchanged with respect to the actuating rod 43 by the not moving catch ring 28'.

At the same time the sealing element 64 is moved axially in the direction of arrow P via the retaining element 62 until it abuts the valve seat 26. This interrupts the connection between the vacuum chamber 14 and the working chamber 12, independently of the position of the valve body 24 with respect to the valve seat 26. This additional interruption prevents a pressure difference from adjusting between the vacuum chamber 14 and the working chamber 12 upon a movement of the movable wall 16 and the valve housing 22 connected with it due to the valve 24, 26 opening, so that a brake pressure building up is reduced again.

As soon as the coil 46 is disconnected from the energy supply, the spring 50 moves the spool 40 again in the direction of the valve arrangement 20 away from the armature 48. This makes the valve body 24' arranged at the front end of the spool 40 to abut the valve seat 26' again, so that a communication with ambient atmosphere is interrupted. The sealing element 64 moves at the same time away from the valve seat 26 (opposite to the direction of arrow P) to cause a pressure compensation between the working chamber 12 and the vacuum chamber 14 as the valve 24, 26 is in its open position.

In an overruled braking, the mechanical movement of the actuating rod 34 by way of a brake pedal is overruled by an automatized braking by activating the coil arrangement 46. This allows the boosting effect of the brake booster to be varied both in time and as regards the boosting factor. E.g. the automatized braking may be activated upon termination of the mechanical operation of the actuating rod (when the driver takes his foot from the brake pedal), namely the sealing element 64 is moved in the direction of the valve seat 26 by operating the coilarrangement, so that no pressure compensation between the vacuum chamber 14 and the working chamber 12 can take place via the valve 24, 26. Rather, the boosting factor is kept up due to the pressure difference between the two chambers until the coil arrangement 46 is deenergized so that the spool 40 is moved away from the armature 48 by the spring 50 which causes the sealing element 64 to open the passage through the valve 24, 26 so that a pressure compensation between the working chamber 12 and the vacuum chamber 14 can take place.

The three different modes of operation are described in the following with reference to FIG. 3.

For a normal, i.e purely mechanical, braking the brake pedal (not illustrated) of the motor vehicle is operated whereupon the actuating rod 140 moves in the direction of arrow B. Said movement is transmitted to the pressure rod 132 by the ball joint 142, which pressure rod 132 effects an axial displacement of the catch ring 128' and 128, respectively, so that the second valve 124' 126' opens while the first valve 124, 126 remains closed. The magnitude of the closing force keeping the first valve 124, 126 closed results from the spring characteristics of the helical spring 156 which is compressed upon movement of the pressure rod 132 in the direction of arrow B.

The housing 122 moves also in the direction of arrow B due to ambient air flowing into the working chamber 112 through the second valve 124', 126', so that the second valve 124', 126' reduces the cross section of its opening again or is closed again in a part-braking position.

When the brake pedal is released, the cone spring 184 moves the actuating rod 140 opposite to the direction of arrow B whereupon the second valve 124', 126' is closed while at the same time the first valve 124, 126 is opened by the circlip 130 and the catch ring 128 being taken along, so that the connection from the working chamber 112 to the vacuum chamber 114 is effected and a pressure compensation between said two chambers results.

As soon as an equilibrium of force between the spring 184 and the springs 156, 158 for spreading apart the bellows 144, 144' is reached, the relative movement between the actuating rod 140 and the housing 122 is terminated.

The return spring 186 can return the entire arrangement into its initial position due to the pressure compensation between the working chamber 112 and the vacuum chamber 114. When returning into the initial position, the actuating rod 140 is the first to reach its end position due to the abutment of the abutment member 150 at the housing 122, whereas the housing 122 can move on relative to the actuating rod 140. This causes the first valve seat 124, 126 to close and the brake booster to be again in its stand-by position.

In an automatized braking operation the electromagnetic actuator 174 is activated via the lines 182, so that the armature 172 with the thrust sleeve 170 arranged thereon is moved in the direction of arrow B. As a consequence, the catch ring 128' is moved against the force of the helical spring 158 in the direction of arrow B whereupon the second valve 124', 126' opens and ambient air flows into the working chamber 112.

Simultaneously with the axial displacement of the second valve seat 126', the control cage 166 is displaced axially in the direction of arrow B by the the same distance. The movement is such that the first valve 124, 126 is urged into its closed position by the control cage 166, so that the connection between the working chamber 112 and the vacuum chamber 114 is closed. Owing to the spring 134 acting on the first valve 124, 126 via the circlip 130 and the catch ring 128, the pressure rod 132 is not being taken along during the movement of the housing 122 in the direction of arrow B. This prevents a movement of the brake pedal.

The resulting differential pressure between the working chamber 112 and the vacuum chamber 114 effects a displacement of the movable wall 116 independently of the brake pedal operation, so that an automatic braking operation is initiated. To terminate the braking operation, the electromagnetic actuator 174 is turned off and the spring 158 moves the armature 172 via the thrust sleeve 170 back to its starting position. As a consequence, the first valve 124, 126 is no longer kept closed by the control cage 166. The spring 134 can again return the circlip 130 against its stop at the pressure rod 132, whereupon the first valve 124, 126 is opened. This balances the pressure difference between the working chamber 112 and the vacuum chamber 114 so that a return movement is performed.

In an overruled braking, the electromagnetic actuator is activated in addition to a normal braking operation, so that the boosting characteristic line of the brake booster becomes steeper. This means that a higher brake pressure is applied to the vehicle brakes though the pedal actuating force is the same. This makes it possible, e.g. when the vehicle carries more load, to increase the brake pedal actuating force to be exerted by the driver to the degree required in each case.

What is claimed is:

1. A pneumatic brake booster comprising a housing (10) which is divided into a vacuum chamber (14) and a working chamber (12), in which a dual valve arrangement (20) having a first valve means (24, 26) between the vacuum chamber (14) and the working chamber (12) and a second valve means (24', 26') between the ambient atmosphere (A) and the working chamber (12) is arranged at the housing (10), in which the valve arrangement (20)

in an inoperative position, allows having pressure levels in the vacuum chamber (14) and in the working chamber (12) separate from the atmosphere (A), in an operative position, keeps the vacuum chamber (14) sealed off and allows communication between the atmosphere (A) and the working chamber (12), in normal operation, the first valve means (24, 26) and the second valve means (24', 26') are adapted to be actuated by a common actuating rod (34), and in a controlled operation, when the actuating rod (34) effects an opening of the first valve means (24, 26), an electromagnetic actuator (40, 46) which is independent of the actuating rod (34) prevents communication between the vacuum chamber (14) and the working chamber (12) by a sealing element (64) coupled to the electromagnetic actuator (40, 46), the electromagnetic actuator (40, 46) so preventing said communication by moving the sealing element (64) into a position preventing a passage through the first valve means (24, 26).

2. The pneumatic brake booster as defined in claim 1 characterized in that the valve seats (26, 26') are formed by two elastic sealing lips (26, 30; 26', 30') which are mutually supported by at least one spring element (54; 156, 158).

3. The pneumatic brake booster as defined in claim 1 characterized in that the first valve seat (26) cooperates with the first valve body (24) which is disposed at the inner wall of a casing (22) of the valve arrangement (20).

4. The pneumatic brake booster as defined in claim 3 characterized in that the first valve body (24) has a rim-shaped continuous edge (24a) along which the sealing element (64) is displaceable with a sliding fit.

5. The pneumatic brake booster as defined in claim 4 characterized in that the sealing element (64) is rigidly connected to the electromagnetic actuator (40, 46).

6. The pneumatic brake booster as defined in claim 1 characterized in that the electromagnetic actuator (40, 46) is arranged to extend coaxially and concentrically with respect to the actuating rod (34).

7. The pneumatic brake booster according to claim 6 characterized in that the electromagnetic actuator (40, 46) is limited in its axial movability by abutment elements (43) cooperating with a respective stop (45) on an inner wall (44) of the valve casing (22).

8. The pneumatic brake booster according to claim 7 characterized in that each abutment element is a projection (43) provided at that end of the electromagnetic actuator (44, 46) which faces the valve arrangement (20).

9. The pneumatic brake booster as defined in claim 2 characterized in that the electromagnetic actuator (40, 46) is at its end facing the valve arrangement (20) provided with a second valve body (24') which cooperates with the second valve seat (26').

10. The pneumatic brake booster as defined in claim 9 characterized in that the second valve body has a rim-shaped continuous edge (24') which cooperates with the second valve seat (26').

11. The pneumatic brake booster as defined in claim 1 characterized in that the electromagnetic actuator (40, 46) is biased against the valve arrangement (20) by a spring element (50).

12. The pneumatic brake booster as defined in claim 11 characterized in that the electromagnetic actuator (40,46) is formed by the coil arrangement (46) surrounding the actuating rod (34) and moving towards an armature element (48) when current is applied, against the force of the spring element (50).

13. The pneumatic brake booster as defined claim 12 characterized in that the armature element (48) is disposed on the actuating rod (34).

14. The pneumatic brake booster as defined in claim 2 characterized in that the valve seats (126, 126') are disposed on a pressure rod (132) which preferably is connected to the actuating rod (140).

15. The pneumatic brake booster as defined in claim 1 characterized in that the first valve seat (126, 126') and the second valve seat are connected to each other by a rigid coupling element (166).

16. The pneumatic brake booster as defined in claim 15 characterized in that at least one of the two valve seats (126, 126') is adapted to be urged into a closed position by the rigid coupling element (166) against a spring (134).

* * * * *